United States Patent [19]
Haga et al.

[11] Patent Number: 5,330,956
[45] Date of Patent: Jul. 19, 1994

[54] POISONING-RESISTANT CATALYST, PROCESS FOR PRODUCTION THEREOF, AND PROCESS FOR USING SAID CATALYST

[75] Inventors: Tetsuro Haga; Hiroshi Kawagoshi; Hisao Yamashita, all of Hitachi, Japan

[73] Assignee: Hitachi, Ltd., Tokyo, Japan

[21] Appl. No.: 947,918

[22] Filed: Sep. 21, 1992

[30] Foreign Application Priority Data

Sep. 20, 1991 [JP] Japan .............................. 3-241456

[51] Int. Cl.$^5$ .................... B01J 21/12; B01J 23/40
[52] U.S. Cl. .............................. 502/261; 502/262
[58] Field of Search .............................. 502/261, 262

[56] References Cited

U.S. PATENT DOCUMENTS

5,202,299   4/1993   Symons et al. ............ 502/261

FOREIGN PATENT DOCUMENTS

0066886   6/1978   Japan ............ 502/262
0026552   3/1981   Japan ............ 502/261
3158129   7/1988   Japan ............ 502/261
1085140   3/1989   Japan ............ 502/261
2-119921  5/1990   Japan .

*Primary Examiner*—Carl F. Dees
*Attorney, Agent, or Firm*—Antonelli, Terry, Stout & Kraus

[57] ABSTRACT

The present invention provides a poisoning-resistant catalyst for combustion of CO and inflammable gases which comprises an inorganic carrier, a noble metal active ingredient supported on said inorganic carrier, and silica supported on said noble metal active ingredient, said noble metal active ingredient comprising at least one member selected from the group consisting of Pt, Rh and Pd, the surface of said catalyst being richer in silica and the inner part of said catalyst becoming richer in said noble metal active ingredient the deeper from the surface said inner part becomes; and a catalytic combustion apparatus for burning inflammable gases in a starting gas by the use of said catalyst. Said catalyst has a high resistance to poisoning and has a high level of activity at a low temperature of 200° C. or lower.

5 Claims, 5 Drawing Sheets

POISONING-RESISTANT CATALYST, PROCESS FOR PRODUCTION THEREOF, AND PROCESS FOR USING SAID CATALYST

BACKGROUND OF THE INVENTION

1. Field of the Invention

The present invention relates to a catalyst for combustion of inflammable gases, and it relates to, in particular, a poisoning-resistant catalyst used for purifying a desired gas by removing inflammable impurities (e.g. CO, $H_2$, hydrocarbons, etc.) in a starting gas by a catalytic combustion method, and a process for producing this catalyst.

2. Description of Related Art

For production of semiconductor devices, various gases are used. In recent years, there has been a growing demand for an ultrahigh-purity gas with an enhancement of the degrees of integration and fineness of semiconductor devices, for the purpose of improving the yield of a product. In particular, nitrogen gas used as a carrier gas or a gas for conditioning an atmosphere has also come to be increasingly required to have an ultrahigh purity, and the permissible content of impurities in the nitrogen gas decreases at an increasing tempo.

In general, high-purity nitrogen gas is collected by separating nitrogen gas from air by subzero fractionation, but a slight amount of CO contained in the starting air cannot be removed by the subzero fractionation because its boiling point is near that of nitrogen. Therefore, CO is burned by the use of a catalyst before the subzero fractionation, and then separated and removed.

Processes for purifying a desired gas by removing such an inflammable gas in a starting gas by a catalytic combustion method have been disclosed, for example, in Japanese Patent Application Kokoku No. 3-7603 and Kokai No, 61-225568 and Japanese Utility Model Kokai No. 61-123389. They comprise converting CO or $H_2$, i.e., an inflammable gas contained in a starting gas, into $CO_2$ or $H_2O$, respectively, by catalytic combustion, separating the $CO_2$ or $H_2O$ by means of an adsorption separator provided in the downstream side of the catalytic combustor, eliminating the same from the system, separating the starting air freed of CO or $H_2$, by a subzero fractionation apparatus, and thereby producing a desired high-purity gas.

As a catalyst used in the above catalytic combustion method, there are generally used noble metal catalysts such as Pt and Pd which have a high activity in a low temperature range. However, when a component poisonous to the catalyst (e.g. $SO_2$ or $H_2S$) is contained in the starting gas, the catalyst is poisoned to be decreased in activity. The decrease of the activity results in a lowered removal rate of the inflammable gas in the starting gas, so that the purity of the gas produced by means of the subzero fractionation apparatus is lowered.

As a means for solving this problem, there is a method in which poisoning of the catalyst is prevented by providing a means for removing the poisonous component, on the inlet side of a catalyst tank. For example, a method for removing $SO_2$ gas, a main component poisonous to the catalyst, has been proposed (Japanese Patent Application Kokai No. 2-119921). However, the provision of a means for removing such a component poisonous to the catalyst increases the cost of production of a catalytic combustion apparatus.

As a method for preventing the catalyst from being poisoned, employment of a high reaction temperature in a catalyst tank is known. In detail, as compared with catalytic combustion at a low temperature, catalytic combustion at a high temperature makes difficult the adsorption of a component poisonous to the catalyst and hence permits suppression of the decrease of activity of the catalyst. However, the employment of the high reaction temperature requires preheating of the starting gas or the catalyst as much, resulting in an increased running cost.

SUMMARY OF THE INVENTION

An object of the present invention is to provide a combustion catalyst having high activity and resistance to poisoning at low temperatures, a process for producing the combustion catalyst, and a combustion apparatus using the combustion catalyst.

Another object of the present invention is to provide a process for using the aforesaid catalyst.

The present inventors conducted various researches and experiments in order to achieve the above objects, and consequently have invented a poisoning-resistant catalyst which itself has a property of hardly adsorbing poisonous components.

The present invention relates to a poisoning-resistant catalyst for combustion of CO and inflammable gases which comprises an inorganic carrier, a noble metal active ingredient supported on the inorganic carrier, and silica supported on the noble metal active ingredient, said active ingredient comprising at least one member selected from the group consisting of Pt, Rh and Pd, the surface of said catalyst being richer in silica and the inner part of said catalyst becoming richer in said noble metal active ingredient the deeper from the surface said inner part becomes; and a catalytic combustion apparatus using said catalyst. More particularly, the present invention relates to such a poisoning-resistant catalyst wherein the amount of silica relative to Pt, Rh and/or Pd is 4 to 20 in terms of the atomic ratio of Si to Pt, Rh and/or Pd.

In addition, the present invention relates to a process for producing a poisoning-resistant catalyst for combustion of CO and inflammable gases which comprises supporting at least one of metal salts of Pt, Rh and Pd on at least the surface layer of an inorganic carrier, carrying out primary firing at 700°–800° C., supporting colloidal silica on the fired product, and then carrying out secondary firing at 400°–600° C.

Furthermore, the present invention relates to a process for producing high-purity nitrogen gas comprising subjecting an inflammable impurity gas in starting air to combustion by the use of a catalyst, removing the combustion product by adsorption, and separating high-purity nitrogen gas from the starting gas freed of the inflammable impurity gas, by subzero fractionation, which process is characterized by using as said catalyst a poisoning-resistant catalyst comprising an inorganic carrier, a noble metal active ingredient supported on the inorganic carrier, and silica supported on the noble metal active ingredient, said noble metal active ingredient comprising at least one member selected from the group consisting of Pt, Rh and Pd, the surface of said catalyst being richer in silica and the inner part of said catalyst becoming richer in said noble metal active ingredient the deeper from the surface said inner part becomes.

The poisoning-resistant catalyst of the present invention can be used also as a combustion catalyst, for example, for treatment of exhaust gas from a combustor, treatment of exhaust gas from a heating appliance, and treatment of exhaust gas from an incineration equipment,

PREFERRED EMBODIMENTS OF THE INVENTION

Figure 1:
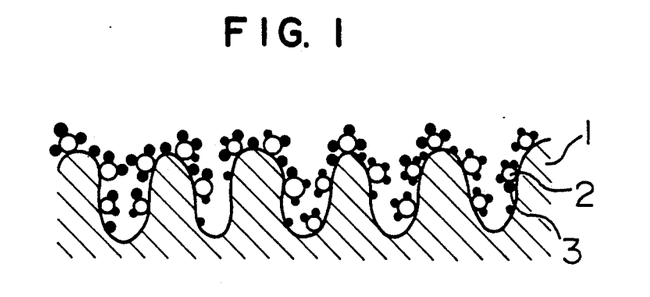
FIG. 1 is a schematic view of the surface structure of the poisoning-resistant catalyst of the present invention.

As shown in the shematic view FIG. 1, the above-mentioned poisoning-resistant catalyst of the present invention comprises an inorganic carrier 1, at least one noble metal 2 such as Pt, Pd or Rh supported thereon as an active ingredient, and silica 3 supported on the noble metal as an ingredient for suppressing the adsorption of poisonous components. At the surface of the catalyst, silica is richer than the noble metal active ingredient, and at the inner part of the catalyst, the noble metal active ingredient becomes richer than silica the deeper from the surface the inner part becomes. Consequently, said catalyst can have a markedly improved resistance to poisoning.

As to the amount of the noble metal supported in the poisoning-resistant catalyst of the present invention and the amount of silica supported on the noble metal, the atomic ratio of Si to the noble metal is preferably 4 to 20. When the ratio is less than 4, the resistance to poisoning is not sufficient. When the ratio exceeds 20, the activity of the catalyst is decreased.

The structure shown in the schematic view FIG. 1 can be given to the poisoning-resistant catalyst of the present invention by supporting a solution or suspension of a salt of the aforesaid noble metal on an inorganic carrier by impregnation or the like, carrying out primary firing at a high temperature, for example, 700° C., impregnating the fired product with silica (e.g. colloidal silica) having a predetermined concentration, and then subjecting the impregnated product to secondary firing. For the activity of the catalyst, the temperature at the primary firing is preferably 700°–800° C., and the temperature at the secondary firing is preferably 400°–600° C.

It was confirmed by means of a scanning electron microscope that the aforesaid catalyst of the present invention has the structure shown in the schematic view FIG. 1.

$TiO_2$, $V_2O_5$, etc. were also examined as inorganic compounds other than silica which suppress the adsorption of poisonous components to the catalyst. Consequently, $V_2O_5$ was found to be effective to a certain extent but inferior to silica. Moreover, silica is superior to them also in cost, etc. because it is much more inexpensive and is not poisonous in itself.

As the salt of the noble metal (Pt, Pd or Rh), there can be used platinum chloride, dinitrodiammineplatinum, platinum tetramine chloride, palladium nitrate, palladium chloride, palladium tetramine chloride, rhodium chloride, rhodium nitrate, hexaminerhodium chloride, rhodium sulfate, etc.

As the silica, colloidal silica is preferable.

As the inorganic carrier, a porous one is preferable. As such porous inorganic substances, there can be used alumina, silica, zirconia, mullite, cordierite, etc. As the shape of the inorganic carrier, any of particulate shape, pellet shape, plate shape, honeycomb structure, etc. may be chosen depending on purposes.

The above-mentioned catalyst of the present invention is used as a catalyst for combustion of inflammable gases in air. More particularly, the catalyst of the present invention is used in an $N_2$-producing apparatus in which $N_2$ gas is produced by a subzero fractionation unit by the use of air as a starting material. The employment of said catalyst makes it unnecessary to provide separately a means for removing poisonous components, and hence it permits simplification of the whole equipment. Furthermore, since it is unnecessary to adjust the reaction temperature of the catalyst to a high temperature in order to suppress the adsorption of the poisonous components, the running cost can be reduced.

The poisoning-resistant catalyst of the present invention has a sufficiently high activity in a low temperature range (75°–200° C.) and can achieve the above-mentioned objects.

When a catalyst containing only a noble metal supported as active ingredient is examined for resistance to poisoning by using a gas containing $SO_2$, this catalyst is rapidly decreased in activity by the influence of the poisonous component $SO_2$. This is because the noble metal catalyst adsorbs $SO_2$ to be decreased in catalytic activity.

On the other hand, it can be speculated that the reason why the catalyst of the present invention has a high resistance to poisoning is that silica supported, as shown in FIG. 1, so as to cover the noble metal catalyst, i.e., the active ingredient supported on the inorganic carrier suppresses the adsorption of poisonous components.

In the above-mentioned poisoning-resistant catalyst, the amount of silica added to the noble metal influences the resistance to poisoning. This is because when the atomic ratio of Si to the noble metal is less than 4, the noble metal catalyst cannot be sufficiently covered with silica. When the atomic ratio exceeds 20, the initial activity tends to be decreased. It is conjectured that the reason for the decrease of the initial activity is as follows. The noble metal catalyst is covered with silica too much, and hence the number of effective active sites is decreased, so that the effect of the catalyst is lessened. Therefore, for obtaining a catalyst having excellent resistance to poisoning and high initial activity, the amount of silica is preferably such that the atomic ratio of Si to the noble metal is 4 to 20.

The present invention is concretely explained below with reference to examples.

Example 1 and Comparative Example 1

$\gamma$-Alumina (11 mm×11 mm×32 mm) having a honeycomb structure was used as an inorganic carrier, and Pt was chosen as a catalyst. A chloroplatinic acid solution was used as a material for Pt. The solution was diluted with distilled water to a given concentration of Pt so that the Pt content of the carrier might reach a given value considering a relation between the water absorption of the carrier and the concentration of Pt (wt %) in the chloroplatinic acid solution. The carrier was immersed in the resulting solution for 15 minutes to be impregnated therewith. The excess solution adhered to the carrier was removed, followed by primary firing in the air at 700° C. for 2 hours. The amount of Pt supported on the carrier was 1.0% by weight.

Next, the primary-firing product thus obtained was impregnated with a colloidal silica solution so as to adjust the atomic ratio of the second component Si to the first component Pt to 5, and was then subjected to secondary firing in the air at 500° C. for 2 hours to obtain a finished catalyst.

Figure 2:
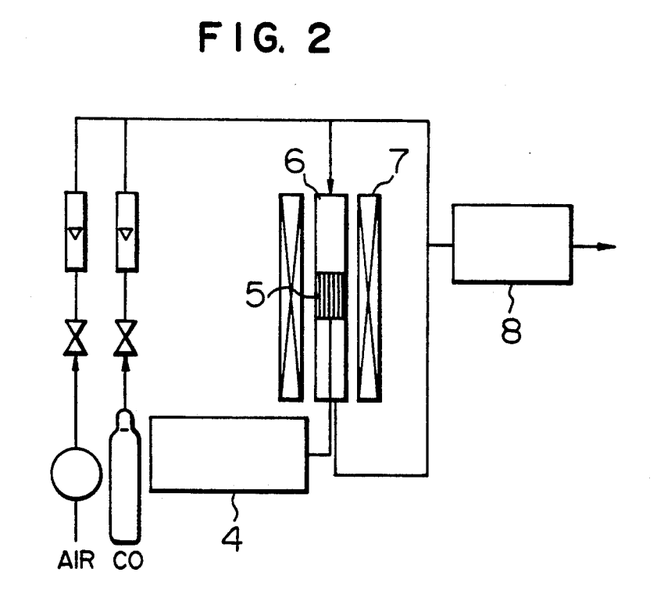
FIG. 2 is a schematic illustration of a tester for evaluating catalytic activity.

The same primary-firing product as above was used as a reference catalyst (a) and compared with the finished catalyst (b) in activity. They were compared in CO removal rate by using a model gas prepared by mixing air with CO gas ($N_2$ balance) which was an inflammable gas. FIG. 2 shows an outline of a tester for evaluating catalytic activity.

A gas prepared by mixing air with an adequate amount of CO gas was passed through a reaction tube 6 packed with a catalyst 5 which had been equipped with a thermocouple 4 in the center of the catalyst having the above honeycomb structure. While heating the reaction tube 6 with an annular electric furnace 7, the gas coming out of the reaction tube 6 was subjected to measurement by means of a gas analyzer 8 to measure the CO concentration in the gas. The removal rate of CO in the starting gas in relation to the reaction temperature was calculated according to the following equation:

CO removal rate (%) = [(A−B)/A]×100 [1]

wherein

A: the CO concentration in the starting gas at the inlet of the reaction tube.

B: the CO concentration in the starting gas at the outlet of the reaction tube.

The test conditions were as follows; CO concentration in the starting gas: 80 ppm (the balance was air), special velocity (SV): 30,000 h-1, temperature: 125° C., pressure: atmospheric pressure.

In addition, the resistance to poisoning of the above catalysts was evaluated by mixing $SO_2$ gas as a poisonous component with the aforesaid starting gas, and comparing the CO removal rates before and after the passage of the $SO_2$-containing gas. The $SO_2$ gas concentration in the starting gas was adjusted to 30 ppm.

Figure 3:
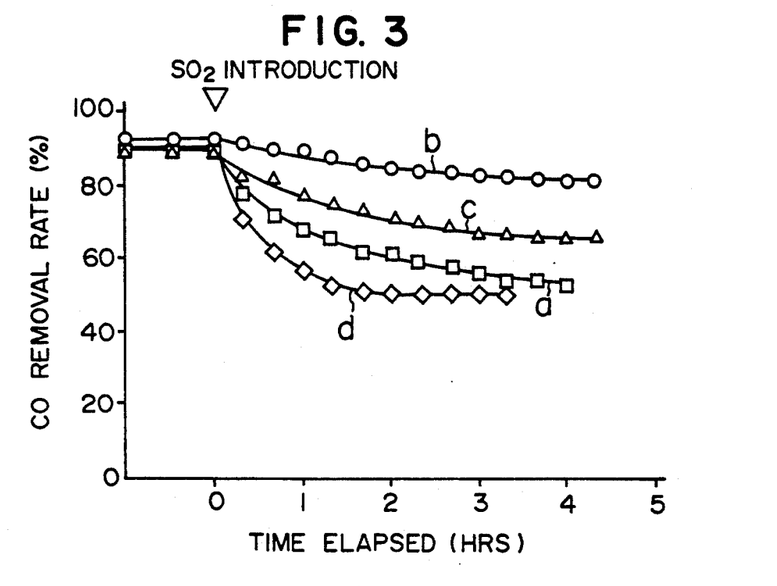
FIG. 3 is a graph showing the level of activity and the resistance to poisoning of catalysts obtained in one example of the present invention.

FIG. 3 shows the level of activity and the resistance to poisoning of each catalyst. As shown in FIG. 3, the catalysts (a) and (b) had substantially the same high levels of initial activity before the passage of $SO_2$ gas. However, when the $SO_2$-containing gas was passed, the catalyst (a) was poisoned by $SO_2$ to be decreased in activity, so that its CO removal rate was lowered to 55% (after the lapse of 5 hours). On the other hand, the CO removal rate of the catalyst (b) was 82%, indicating that this catalyst has a high resistance to poisoning.

Next, the $SO_2$ adsorption capacity of the catalysts (a) and (b) was measured. The measurement was carried out by passing $SO_2$ gas (He balance) in pulses with heating at 125° C. Consequently, the $SO_2$ adsorption capacity of the catalyst (a) was about 8.5 ml/g, while that of the catalyst (b) was as small as 3.5 ml/g. This fact also indicates that the catalyst (b) had a high resistance to poisoning.

In the same manner as above, there was measured the CO removal rate of catalysts obtained by using $V_2O_5$ or $TiO_2$, respectively, as a poisoning-resistant substance (the second component) in place of silica. These catalysts were named catalysts (c) and (d), respectively, and the measurement results are also shown in FIG. 3. The catalyst (c) was produced in the same manner as for the catalyst (b) except for using ammonium vanadate ($NH_4VO_3$) for preparing the same reference catalyst (a) as above. The catalyst (d) was produced in the same manner as for the catalyst (b) except for using titania sol for preparing the same reference catalyst (a) as above.

Example 2

Catalysts were produced by supporting various amounts of silica on the same primary-firing product (containing Pt catalyst supported) as described in Example 1. The relationship between the atomic ratio of Si to Pt and the resistance to poisoning was determined. The resistance to poisoning was evaluated in the same manner as described in Example 1. It was evaluated in terms of the CO removal rate after the lapse of 4 hours after the passage of the $SO_2$-containing gas. The test conditions were the same as in Example 1.

Figure 4:
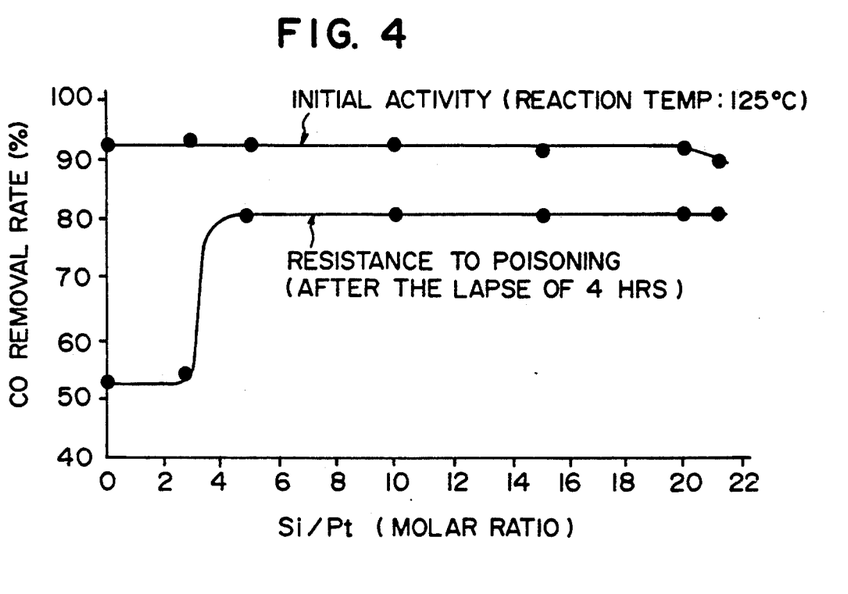
FIG. 4 is a graph showing a relationship between Pt/Si (atomic ratio) of catalysts and their level of initial activity and resistance to poisoning.

In FIG. 4, the level of initial activity and the resistance to poisoning 4 hours after the passage of the $SO_2$-containing gas, at various Pt/Si atomic ratios are shown in terms of the CO removal rate.

It can be seen from FIG. 4 that when the amount of Si exceeds 20 (atomic ratio), the level of initial activity is decreased. When the amount of Si is as small as less than 4 (atomic ratio), the CO removal rate is equal to that of the catalyst (a) containing Pt alone. However, even when the amount of Si is more than 20 (atomic ratio), the resistance to poisoning is not decreased. These facts indicate that the atomic ratio of Si to Pt is preferably 4 to 20 for attaining both a satisfactory resistance to poisoning and a satisfactory level of initial activity.

Example 3 and Comparative Example 2

The same $\gamma$-alumina (11 mm×11 mm×32 mm) having a honeycomb structure as in Example 1 was used as a carrier, and Pd was chosen as a catalyst. Using a palladium nitrate solution as a material for Pd, a primary-firing product was produced in the same manner as described in Example 1. The amount of Pd supported was 1.0% by weight. Then, the primary-firing product was impregnated with a colloidal silica solution in the same manner as described in Example 1, and subjected to secondary firing in the air at 500° C. for 2 hours to obtain a finished catalyst.

The same primary-firing product as above was used as a reference catalyst (e) and compared with the finished catalyst (f) in activity. As to the amount of Si in the catalyst (f), the atomic ratio of Si to Pd was adjusted to 5 by adjusting the concentration of the colloidal silica solution.

Figure 5:
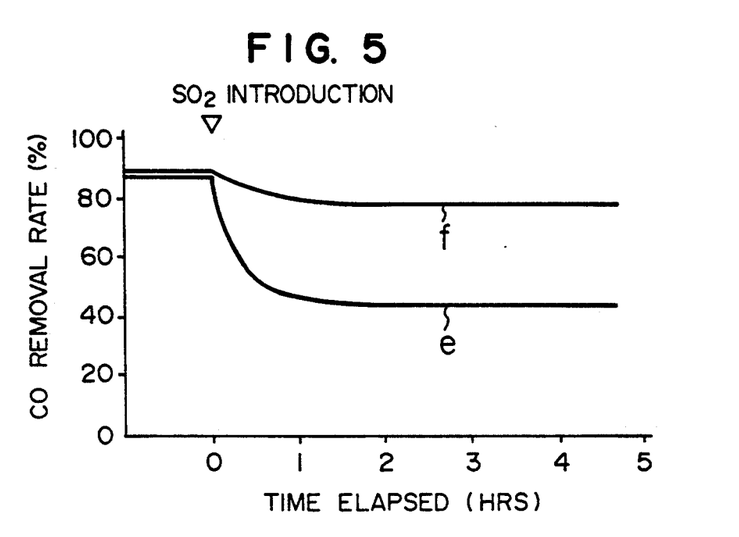
FIG. 5 is a graph showing a relationship between the level of activity and the resistance to poisoning of catalysts obtained in another example of the present invention.

FIG. 5 shows the results of evaluating the level of activity and the resistance to poisoning of the above catalysts (e) and (f). The same measuring methods as in Example 1 were employed. In the case of Pd, the same results as those obtained for the aforesaid Pt catalyst were obtained.

Example 4

The initial activity and the resistance to poisoning of the catalysts (a) and (b) produced in Example 1 were evaluated using $H_2S$ as a poisonous component gas. The $H_2S$ concentration in a starting gas was adjusted to 30 ppm, and comparative tests were carried out under the same conditions as described in Example 1.

Figure 6:
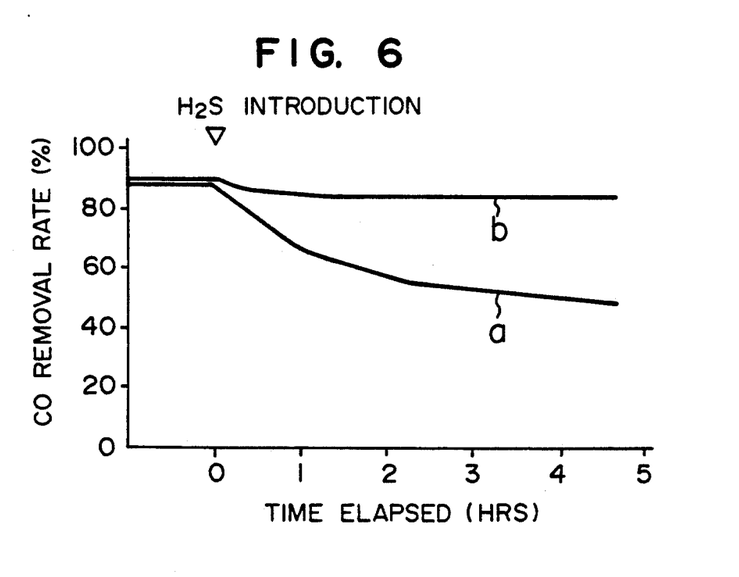
FIG. 6 is a graph showing the level of activity and the resistance to poisoning of the catalysts obtained in the one example of the present invention in which the poisonous component is $H_2S$.

FIG. 6 shows the level of activity and the resistance to poisoning of the above catalysts (a) and (b). As shown in FIG. 6, both catalysts had the same level of initial activity before the passage of $H_2S$ as that attained in Example 1. When the poisonous component $H_2S$ was passed in admixture with the starting gas, the reference catalyst (a) containing Pt alone was poisoned by $H_2S$ to be rapidly decreased in activity. On the other hand, it was found that the catalyst (b) containing silica supported had a high resistance to poisoning and that its resistance to poisoning was not particularly changed even when $H_2S$ was present as a poisonous component in place of $SO_2$.

Example 5

Figure 7:
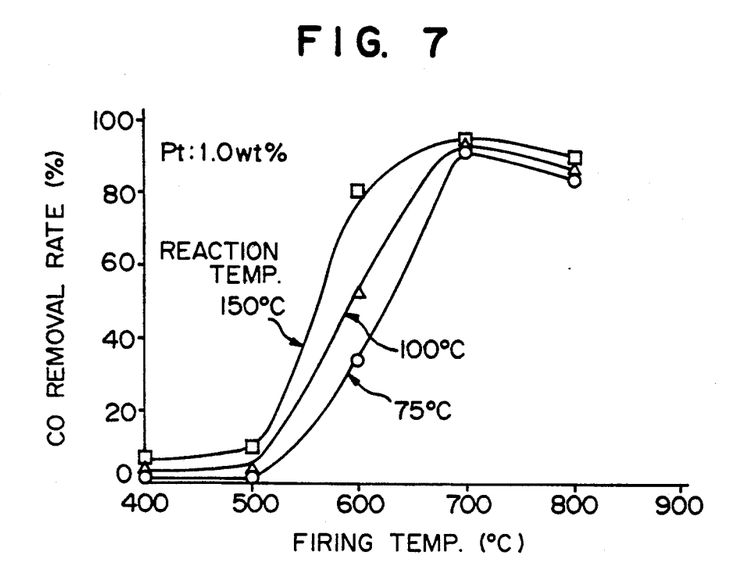
FIG. 7 is a graph showing a relationship between primary-firing temperature and CO removal rate which was determined for catalysts of the present invention.
Figure 8:
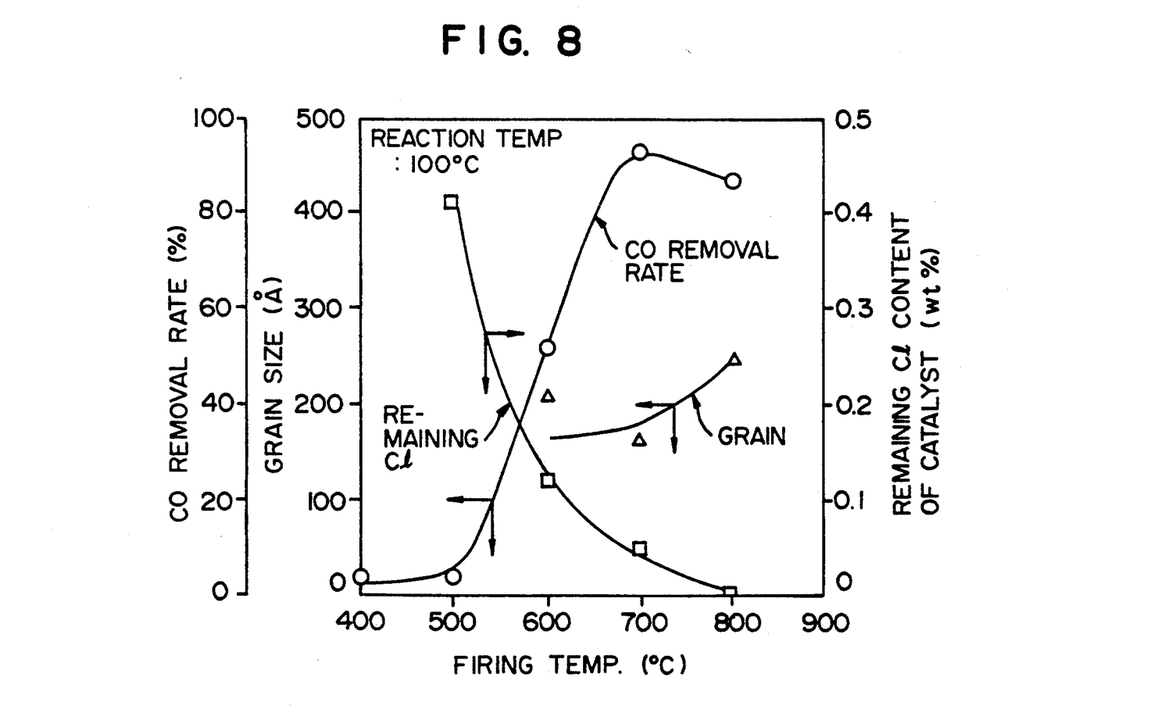
FIG. 8 is a graph showing a relationship between primary-firing temperature and the content of remaining chlorine which was determined for catalysts of the present invention.

Catalysts of the present invention produced in the same manner as in Example 1 except for varying the primary-firing temperature were compared in CO removal rate. The results obtained are shown in FIG. 7. The secondary-firing conditions were 500° C. for 2 hours. As can be seen from FIG. 7, the primary-firing temperature is preferably 700°-800° C. As can be seen from FIG. 8, the primary-firing temperature is related to the content of remaining chlorine in the catalysts. It can be speculated that catalysts equal to one another in catalytic activity can be obtained by adjusting the aforesaid chlorine content to 0.1% by weight or less.

The secondary-firing temperature was also investigated in the same manner as for the primary-firing temperature to find that it is preferably 400°-600° C.

Furthermore, it is clear from FIG. 7 that the catalyst of the present invention can have a sufficient catalytic action at a reaction temperature of as low as 75° C.

Example 6

Figure 9:
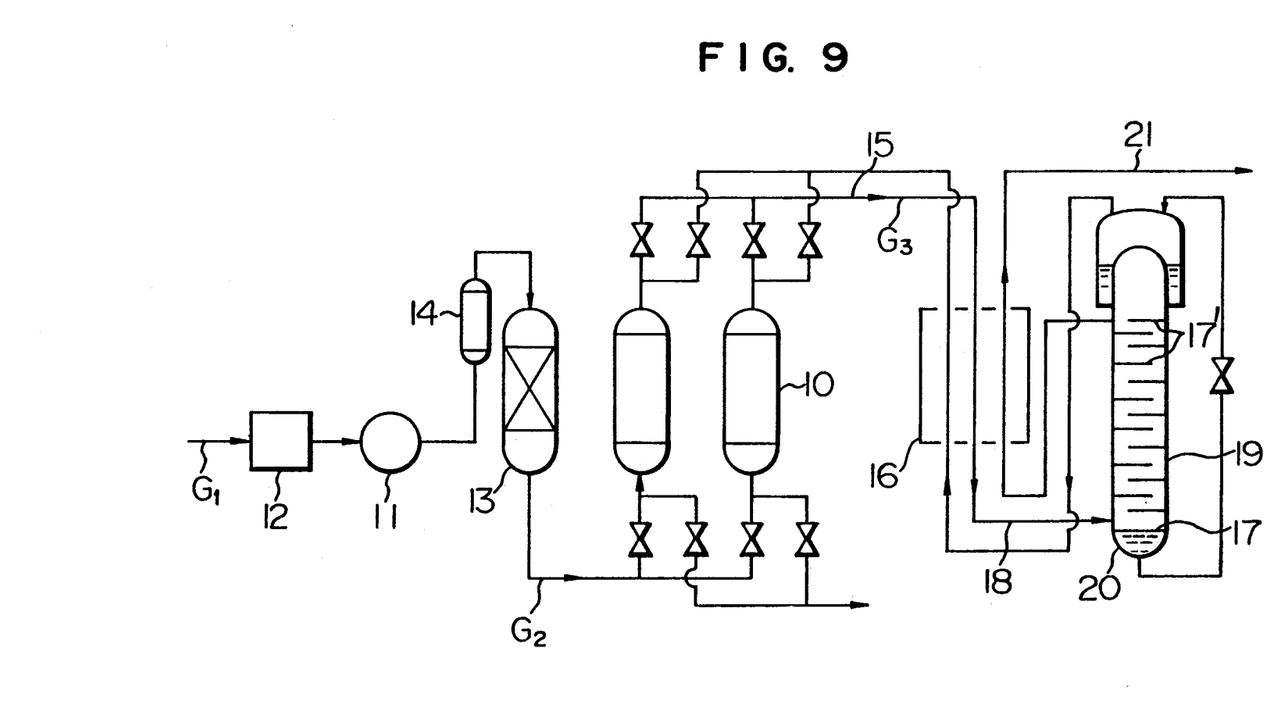
FIG. 9 is a system flow diagram of an apparatus for producing high-purity nitrogen gas which is one example of employment of the poisoning-resistant catalyst of the present invention.

FIG. 9 shows a system flow diagram of an apparatus for producing high-purity nitrogen gas which is one example of employment of the poisoning-resistant catalyst of the present invention.

Starting air $G_1$ which has been passed through a dust removing unit 12 and pressurized to a predetermined pressure in a compressor 11 is fed to a catalyst tank 13. A heater 14 is provided on the inlet side of the catalyst tank 13 and heats the starting air $G_1$ to a predetermined temperature. The heater 14 is controlled so as to adjust the temperature of the starting air $G_1$ to a temperature in the reaction temperature range (75°-200° C.) of the catalyst.

The poisoning-resistant catalyst (not shown) having a honeycomb structure is packed into the catalyst tank 13.

The starting air $G_1$ preheated in the heater 14 flows into the catalyst tank 13. In the catalyst tank 13, an inflammable gas component such as CO or $H_2$ contained in the starting gas $G_1$ is burned, whereby CO is converted into $CO_2$ and $H_2$ into $H_2O$. The thus obtained gas containing such a combustion product (hereinafter referred to as the starting gas $G_2$) is sent to an adsorption separator 10 provided on the outlet side of the catalyst tank 13, and the impurity such as $CO_2$ or $H_2O$ is adsorbed and removed. The gas thus freed of $CO_2$ and $H_2O$ (hereinafter referred to as the starting air $G_3$) is fed to a subzero fractionation unit 20 through a conduit 15.

The subzero fractionation unit 20 is composed mainly of a subzero fractionation portion 19, a heat exchanger 16, a rectifying column 17 and the like. First, the starting air $G_3$ is introduced into the heat exchanger 16. In the heat exchanger 16, the starting air $G_3$ exchanges heat with previously separated $N_2$ gas having a low temperature, to be cooled.

Then, the starting air $G_3$ cooled is fed to the lower part of the rectifying column 17 through a conduit 18. In the lower part, the starting air $G_3$ comes in vapor-liquid contact with a liquid in a large number of rectifying trays 17' provided in the rectifying column 17, whereby it is rectified and separated. $N_2$ gas is taken out through a conduit in the upper part of the rectifying column 17 and sent out as product $N_2$ gas through a conduit 21.

When the product $N_2$ gas is sent out in the manner described above, the hardly separable gas such as CO or $H_2$ contained in the starting air is removed by the catalytic combustion in the step prior to the rectification, so that the product $N_2$ gas is high-purity $N_2$ gas which does not contain such an impurity CO, $H_2$ or the like. In particular, the poisoning-resistant catalyst of the present invention is used in the catalyst tank, and therefore even when the starting air contains a poisonous component ($SO_2$, $H_2S$ or the like), the catalyst is only slightly decreased in activity, so that the removal rate of the inflammable gas is not decreased. Therefore, high-purity $N_2$ gas can be stably produced.

What is claimed is:

1. A poisoning-resistant catalyst for combustion of CO and inflammable gases in air containing a poisonous component for the catalyst which comprises an inorganic carrier, a noble metal active ingredient supported on said inorganic carrier, and silica supported on said noble metal active ingredient, said noble metal active ingredient comprising at least one member selected from the group consisting of Pt, Rh and Pd, an outer part of the surface of said catalyst being richer in silica and an inner part of said catalyst becoming richer in said noble metal active ingredient the deeper from the outer part of the surface said inner part becomes; the amount of silica relative to said at least one member selected from the group consisting of Pt, Rh and Pd being 4 to 20 in terms of the atomic ratio of Si to said at least one member selected from the group consisting of Pt, Rh and Pd.

2. A poisoning-resistant catalyst according to claim 1, wherein alumina having a honeycomb structure is used as said inorganic carrier.

3. A poisoning-resistant catalyst for combustion of CO and inflammable gases in air containing a poisonous component for the catalyst which is produced by supporting at least one of metal salts of Pt, Rh and Pd on at least the surface layer of an inorganic carrier, carrying out primary firing at 700°–800° C., supporting colloidal silica on a part of the surface of the fired product, and then carrying out secondary firing at 400°–600° C.

4. A poisoning-resistant catalyst according to claim 3, wherein the concentration of said colloidal silica on a part of the surface is such that the amount of silica relative to at least one of Pt, Rh and Pd is 4 to 20 in terms of the atomic ratio of Si to at least one of Pt, Rh and Pd; the concentration of said colloidal silica being greater at an outer part of the surface than at an inner part of the catalyst.

5. A poisoning-resistant catalyst according to claim 3 or 4, wherein alumina having a honeycomb structure is used as said inorganic carrier.

* * * * *